Nov. 5, 1946.   C. J. WERNER   2,410,695
ACTUATOR CONTROL SYSTEM
Filed March 14, 1945   2 Sheets-Sheet 2
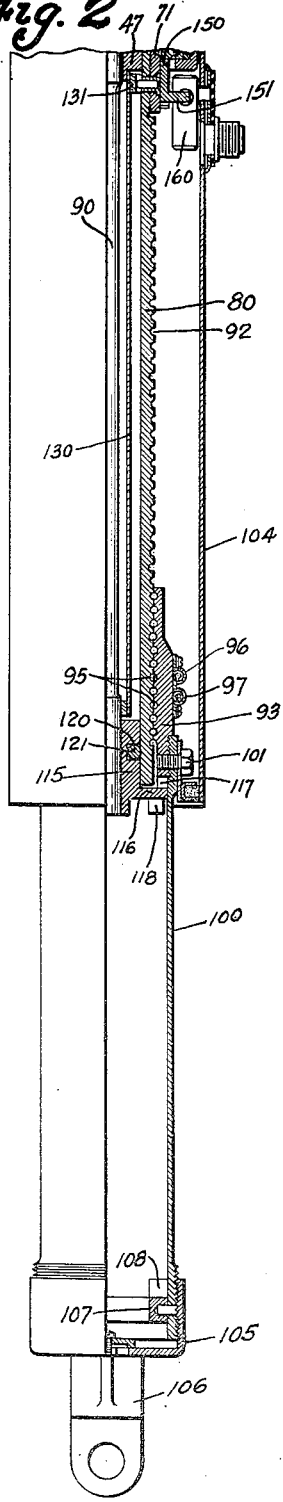
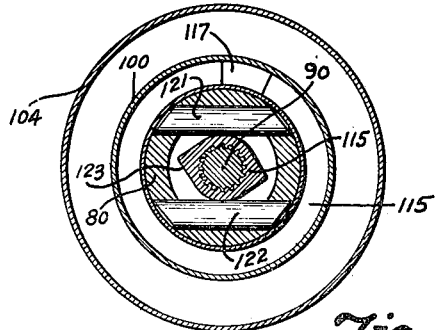
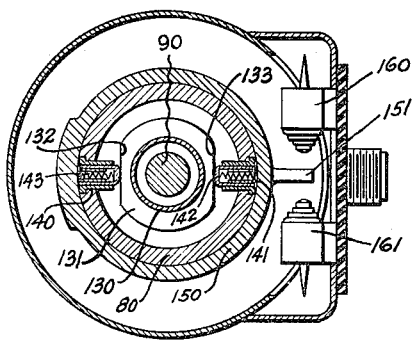
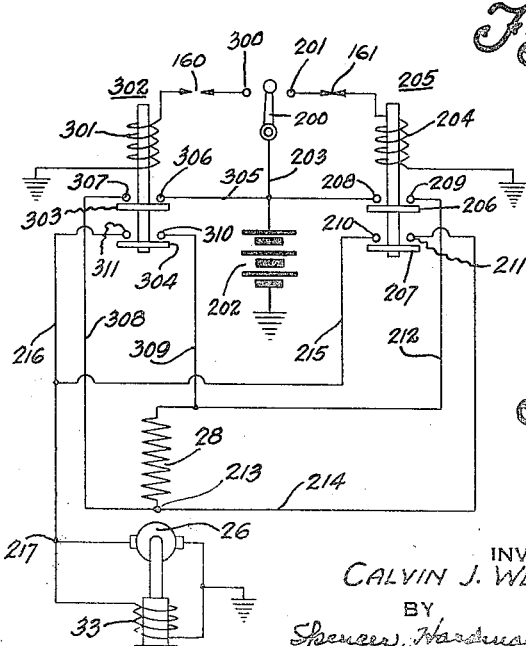
INVENTOR
CALVIN J. WERNER
BY
HIS ATTORNEYS Patented Nov. 5, 1946

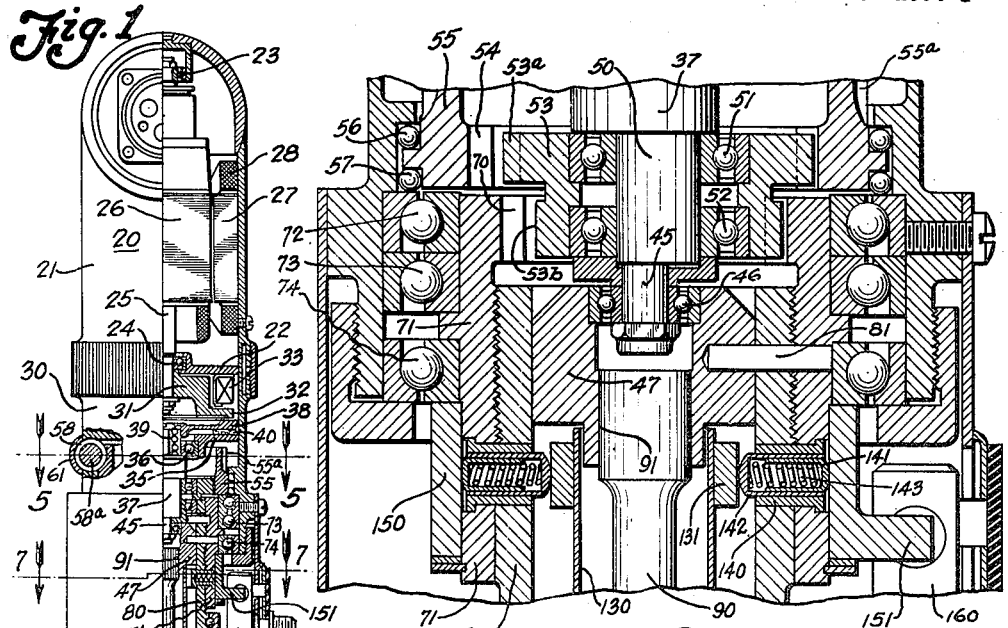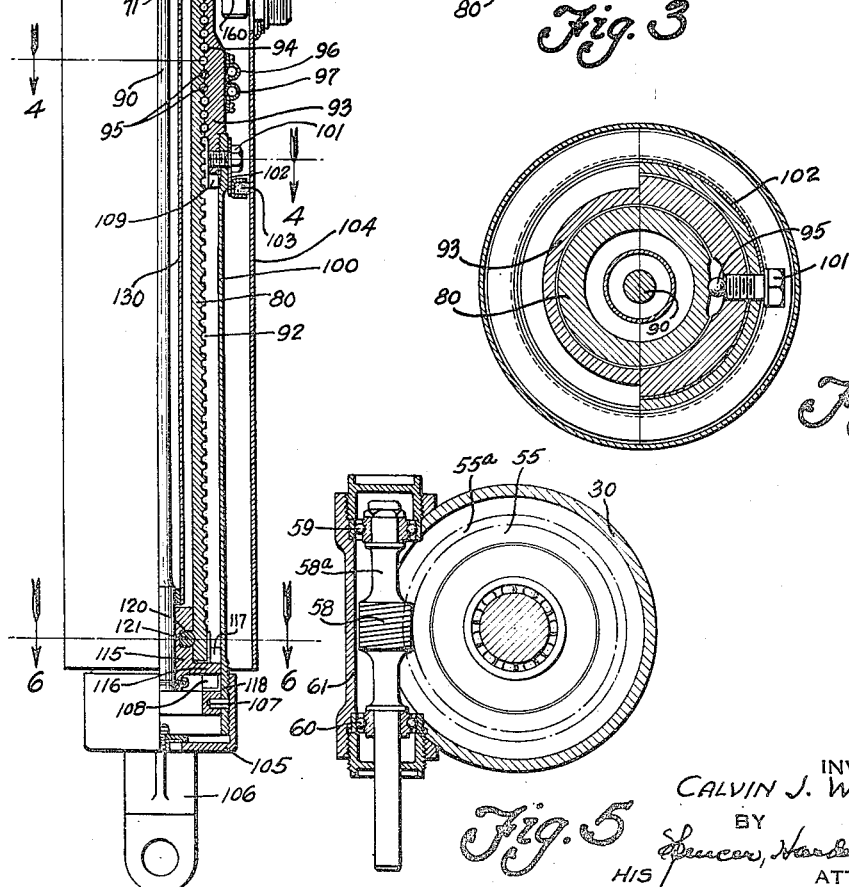

2,410,695

UNITED STATES PATENT OFFICE 2,410,695

ACTUATOR CONTROL SYSTEM

Calvin J. Werner, Dayton, Ohio, assignor to General Motors Corporation, Detroit, Mich., a corporation of Delaware Application March 14, 1945, Serial No. 582,777

14 Claims. (Cl. 192—142)

1

This invention relates to improvements in actuators operated by a reversible electric motor for moving a load from one selected position to another.

It is among the objects of the present invention to provide a motor-driven, load moving actuator with control mechanism rendered operative by a movable part of the actuator for automatically stopping the operation of the electric motor when the load has been moved from one predetermined position to another.

A further object of the present invention is to provide an actuator with control mechanism, operative not only to discontinue activity of the prime mover when the actuator has moved its load into a predetermined position, but also operative to provide a suitably safe, sturdy stop for the moving parts of the actuator, thereby eliminating the application of damaging shocks to more delicate parts thereof.

These and other objects are accomplished by providing an actuator comprising a reversible electric motor connectible by means of an electromagnetic clutch in circuit with said motor and with a screw shaft. A nut is threadedly supported by the screw shaft and, in response to rotation of the screw shaft, is movable longitudinally thereon. The nut is constructed and arranged to have the load attached thereto, thus rendering the nut non-rotatable.

Limit switches, connected in circuit with the motor and electromagnetic clutch, are operative to stop motor operation. They are so arranged relatively to each other and to the actuator for operating them that, when one switch is operated to break the motor circuit, the other switch will have been closed preparatory to motor operation in the opposite direction.

The limit switches are operated by an actuator idly supported upon the motor driven screw shaft. A torsion rod or bar has its one end anchored to the screw shaft so that said bar rotates therewith, the other end of the bar having an abutment member attached thereto so as to be rotatable therewith. This abutment member comprises oppositely disposed lugs which are engageable respectively by spaced lugs on the nut when said nut is moved into one or its other selected positions on the screw shaft in response to rotation therewith. When a lug of the nut engages a lug of the abutment member, the nut, being non-rotatable, will cause said abutment member to be locked against rotation. Therefore continued rotation of the screw shaft will cause a

2 torsional effort to be applied to the torsion bar, resulting in a twisting thereof.

One end of a tubular member surrounding the bar is securely fastened to the torsion bar adjacent the abutment member thereon. At the opposite end of this tubular member a cam is provided. This cam engages normally inoperative frictional clutch pins carried by the rotating screw shaft. As the screw shaft rotates and the nut is moving longitudinally therewith from one position to another, these friction pins, the cam and its supporting tubular member, the abutment member and the torsion bar will all rotate in unison. However, as soon as the nut reaches an extreme position in response to this movement of the screw shaft and engages the abutment member to lock it against rotation, a twisting of the torsion bar is effected, and also a stoppage of the tubular member thereon. Relative rotation between the screw shaft and the tubular member with its cam will actuate the clutch pins to secure the switch actuator to the rotating screw shaft and thus the switch actuator operates the switch to stop the motor. One switch is opened by screw shaft rotation in one direction and the other switch when the shaft rotates in the opposite direction. A lost motion connection is provided between the screw shaft and the abutment member. This lost motion connection permits limited rotation relatively between the screw shaft and abutment member when the abutment member is locked against rotation by the nut. During this relative rotation the torsion bar is being twisted by continued rotation of the screw shaft. However, when the lost motion phase of this connection is over, pins carried by the screw shaft will positively engage the non-rotating abutment member and bring the entire actuating mechanism to a stop. These pins and the actuator are of comparatively sturdy construction so designed as to take the shock which is present when the coasting or otherwise prolonged movement of the actuator after the motor ceases to drive it to a complete stop, thus damaging shocks which might otherwise be applied to more delicate portions of the actuator are completely avoided.

Further objects and advantages of the present invention will be apparent from the following description, reference being had to the accompanying drawings, wherein a preferred embodiment of the present invention is clearly shown.

In the drawings:

Fig. 1 is a partial longitudinal section of the complete actuator. In this figure the actuator is shown completely contracted.

Fig. 2 on the second sheet of the drawings is a partial sectional view of a fragment of the actuator shown in Fig. 1, including substantially all parts below the line 7—7 of the Fig. 1. In this Fig. 2 this lower portion of the actuator is shown in its fully extended position. The portion of the actuator not shown in Fig. 2 is substantially like that shown in Fig. 1 above the line 7—7 thereon.

Fig. 3 is an enlarged fragmentary sectional view of the driving mechanism interposed between the electric motor and the screw shaft.

Fig. 4 is a transverse section taken substantially along the line 4—4 of Fig. 1.

Fig. 5 is a transverse section taken along the line 5—5 of Fig. 1.

Fig. 6 is a transverse section taken along the line 6—6 of Fig. 1.

Fig. 7 is a transverse section taken along the line 7—7 of Fig. 1.

Fig. 8 is a wiring diagram showing the electrical device and its connections in an installation including the actuator.

As has been stated previously, the actuator comprises an electric motor 20, which consists of a motor housing 21 having a partition 22. Coaxially aligned bearings 23 and 24 supported by the housing 21 and its partition 22 rotatably supports the shaft 25 of the motor armature 26. The stator 27 of the motor having the motor field 28 thereon is supported by the motor housing 21.

The motor shaft 25 extends through and beyond the partition 22 of the motor housing into the main actuator housing 30 upon which the motor housing 21 is secured in any suitable manner. A driving disc 31 is secured to the end of the armature shaft 25 extending into housing 30, this driving disc having an outwardly extending annular flange 32, the peripheral edge of which is spaced a predetermined distance from the inner annular surface of the actuator housing 30. A magnet winding 33 is carried by the partition 22 to surround the driving disc 31 and magnetize it when said magnet winding 33 is energized. As will detailedly be described hereinafter, magnet winding 33 is connected in circuit with the motor field winding 28 so as to assure energization of the magnet winding when the motor circuit is completed for motor operation.

The actuator housing 30 has a partition 35 therein, said partition being centrally apertured and recessed to support ball bearing 36. One end of a jack shaft 37 is journalled in this bearing 36. An armature disc 38 is keyed to the end of the jack shaft journalled in and extending beyond the bearing 36 so that said armature disc and jack shaft must rotate together and that the armature disc may be slidable longitudinally relatively thereto. A spring 39, in a recess in the end of the jack shaft supporting the armature disc 38, is operatively connected to the armature disc and yieldably urges said disc into frictional engagement with a brake ring 40 carried by and secured to the partition 35 in the actuator housing 30. The upper surface of this armature disc 38 is parallel with and spaced a small distance from the lower or adjacent surface of the driving disc 31 providing an air gap therebetween across which magnetic lines of force may pass. The peripheral edge of the armature disc 38 is in closer proximity to the inner annular surface of the actuator housing 30 than the peripheral edge of the driving disc flange 32 so that when the electromagnet winding 33 is energized, magnetic lines of force will traverse partition 22 and housings 21 and 30 across the narrow air gap between the inner annular surface of housing 30 and the outer peripheral surface of the armature disc 38, then across the air gap between the upper surface of the armature disc and the adjacent surface of the driving disc 31 and through the driving disc to the partition 22, thus completing the magnetic circuit which will energize the disc 31 to attract the armature disc 38 and move it from frictional engagement with the brake 40 into operative engagement with the driving disc 32 whereby the armature disc 38 will be rotated by the driving disc 31 to rotate the jack shaft 37 upon which the armature disc 38 is keyed.

Referring particularly to the Figs. 1 and 3, the jack shaft 37 is shown having a lower end portion 45 coaxial with the portion of the jack shaft keyed to the armature disc 38. This portion 45 of the jack shaft is journalled in a roller bearing 46 supported in a block 47 to be referred to hereinafter. Between its end portions the jack shaft 37 has an eccentric portion 50 upon which two roller bearings 51 and 52 are mounted, said roller bearings carrying the epicycloidal gear unit 53 having two sets of gear teeth, one designated by the numeral 53a, the other by the numeral 53b. The teeth 53a of the epicycloidal gear unit 53 operatively engage the teeth 54 of a ring gear 55 rotatably supported in the actuator housing 30 by bearings 56 and 57. Predeterminately less gear teeth 53a are provided on the gear unit 53 than gear teeth 54 on the ring gear 55. Gear teeth 55a are cut in the outer annular face of gear 55 adjacent its upper end, these gear teeth 55a being engaged by a worm screw 58 provided on shaft 58a. This shaft is rotatably supported by two bearings 59 and 60 supported in a housing 61 which is a substantially tangential extension formed on the main actuator housing 30. Ordinarily this worm screw 58 engaging with the teeth 55a of ring gear 55 holds said ring gear against rotation in the housing 30; however, under certain circumstances shaft 58a may be rotated manually in order to effect manual operation of the actuator.

The teeth 53b on the epicycloidal gear unit 53 operatively engage and mesh with gear teeth 70 provided on the inner annular surface of sleeve 71, the gear teeth 53b on unit 53 being less in number than the gear teeth 70 on the sleeve 71. This sleeve 71 is rotatably carried in housing 30 by a series of roller bearings 72, 73 and 74 so that sleeve 71 may be rotated in said housing.

The screw shaft 80, which is of tubular construction, has its upper or inner end threadedly received by the sleeve 71 and is secured to said sleeve by the locking pin 81. This locking pin also extends into the block 47, which fits into the upper, inner end of the tubular screw shaft 80. Thus block 47, screw shaft 80 and the collar 71 are all secured together by the locking pin 81 and rotate together.

A torsion bar or rod 90 has its upper end splined in a central opening in block 47 as at 91. This torsion bar is coaxial with the tubular screw shaft 80 and, as shown in Fig. 1, extends slightly beyond the lower end of the screw shaft. The outer annular surface of the tubular screw shaft 80 extending beyond the confines of sleeve or collar 71 is provided with a helical groove 92 of substantially semi-circular cross section.

The nut 93 slidably fits upon the screw shaft 80, the inner annular surface of said nut adjacent the screw shaft being provided with a helical groove 94 of substantially semi-circular cross section and coinciding in pitch with the helical groove 92 on the screw shaft. A series of ball bearings 95 are placed in the substantially annular space formed by the coinciding grooves of the screw shaft and nut mechanically to secure the nut to the screw shaft in a manner similar to which an ordinary nut is secured to an ordinary screw. In practice generally two sets of ball bearings are provided between the nut and the shaft, each set filling about one and a half convolutions of the groove or annular space formed by the grooves and also extending into feeder channels 96 and 97 provided outside the nut 93 and in communication with the grooves in which the ball bearings of a certain set of bearings operate. Thus in turning the screw and holding the nut against rotation, the nut will be caused to move longitudinally on the screw and during this movement the bearings will continue to travel through the respective convolution and a half of the helical groove between the screw and nut and through the feeder channels 96 and 97 respectively.

The lower end of nut 93 has one end of a tubular member 100 secured thereto in any suitable manner. Set screws 101 which secure tube 100 to the nut also support a bracket 102 which carries a sealing element 103 slidably engaging the inner annular surface of an outer protector tube 104 surrounding all this mechanism and having its upper end secured to the main actuator housing 30 in any suitable manner. The lower end of tube 100, or more particularly the end opposite the nut 93 has a collar 105 secured thereto which provides the bracket 106 adapted to be secured to the load. An abutment collar 107 is also secured on the inside of the lower end of tube 100, this collar providing a sturdy lug 108 for purposes to be described. A similar locking lug 109 is provided on the lower peripheral edge of the nut 93.

The lower end of the torsion bar 90, or more particularly the end thereof opposite that secured to block 47, has the abutment member 115 splined and press-fitted thereon so that said abutment member must turn with the torsion bar 90 when it is rotated by the screw 80. This abutment member has its hub portion pressed upon the lower end of the torsion bar 90, said hub portion loosely or rotatably fitting into the lower end of the tubular screw shaft 80. An outwardly extending annular flange 116 is provided on the abutment member 115, the outer peripheral surface of which fits loosely into the tube 100. Oppositely disposed locking lugs 117 and 118 are provided on the flange 116 of the abutment member 115. When the screw 80 is rotated to move the nut 93 downwardly thereon, the locking lug 109 on said nut will, when the nut reaches the extreme lowermost position, lockingly engage the lug 117 on the abutment member 115. This is clearly shown in the Fig. 2. When the screw shaft 80 rotates in the opposite direction to move the nut from its lowermost extreme position to its uppermost extreme position as shown in Fig. 1, the locking lug 108 on the collar 107, secured to the lowermost end of the tube 100 fastened to the nut 93, will lockingly engage the lug 118 on the lower surface of the flange 116 of abutment member 115. The purpose of these locking engagements between the respective lugs 109—117 and 108—118 will detailedly be described hereinafter.

Referring particularly to Figs. 1 and 6, it may be seen that the abutment member 115 has an annular groove 120 into which cross pins 121 and 122, carried by the screw shaft 80, extend. The inner surface of the groove 120 is cam shaped as at 123. This provides a lost motion connection between the abutment member 115 and the screw shaft 80, permitting relative movement between them under certain circumstances, but locking them positively together when the cross pins 121 coincide with flattened portions of the cam 123 for taking the shock at stopping of the actuator.

The end of the torsion bar 90 to which the abutment member 115 is secured, has one end of a surrounding tubular member 130 anchored thereto, this tubular member 130 extending upwardly around the torsion bar 90 and terminating just short of the lower end surface of the block 47 to which the opposite end of the torsion bar is anchored.

At this upper end of tube 130 there is attached an annular cam collar 131 having oppositely disposed flattened surfaces 132 and 133 which are spaced at lesser distance from the center of the tube 130 than the circular surfaces of said collar, thus surfaces 132 and 133 may be termed the "idling" surfaces of the cam while the circular surfaces may be termed the "working" faces.

This cam collar 131 is in direct alignment and engages oppositely disposed clutch pins carried by the screw shaft 80 and its attached collar 71. Fig. 3 more clearly illustrates these clutch pins and shows them each comprising a bushing 140 secured in aligned openings in the screw shaft 80 and its attached collar 71, said bushing supporting telescopically engaging cylinders 141 and 142 closed at their outer ends and having a spring 143 interposed therebetween. This spring yieldingly urges cylinder 142 so that its closed end rides on the cam collar 131 while the closed end of the cylinder 141 is yieldably urged into engagement with the annular surface of the actuator 150 which is carried by the collar 71 attached to the screw shaft 80 so that said collar 71 may normally rotate relatively to the actuator 150. All of the clutch pins are identical, and therefore only one is described detailedly.

The actuator 150 in the form of a tubular hub rotatably supported on collar 71 has a radial arm 151 extending therefrom. Figs. 3 and 7 clearly show this actuator, the Fig. 3 particularly showing its radial arm 151 positioned between two limit switches 160 and 161, the actuator buttons of both being predeterminately spaced from the respective sides of the actuator arm 151. This actuator arm is adapted to be rotated when the clutch fingers are operated to secure the actuator 150 to the collar 71 secured to the rotating shaft 80. If the shaft 80 rotates clockwise in accordance with Fig. 7, then the radial arm 151 of the actuator 150 will move toward limit switch 161 to actuate it to open its circuit. At the same time switch 160 will be in circuit closing position, for as soon as said switches are released by arm 151 they automatically close. Reverse operation of the screw shaft will cause the actuator to operate switch 160 to open its circuit while limit switch 161 will again be permitted to close the gap in its circuit.

The actuator shown in the present invention may be used in any installation where a load is to be moved from one particular position into another. The actuator shown in the present drawings is particularly adapted to raise and lower landing gears of airplanes. The upper end of the actuator, in this instance, the motor housing, has anchoring members adapted to be secured thereto for attaching this portion of the actuator to the body or fuselage of the plane. The attachment member 106 of the actuator may be secured to any suitable strut of the landing gear by means of which the landing gear is drawn into the fuselage when the actuator is operated to assume its retracted position as shown in Fig. 1. To lower the landing gear, control mechanism is operated to effect motor operation whereby the nut 93 is moved downwardly upon the screw shaft 80 to move the various parts of the actuator into relative positions as shown in Fig. 2.

Supposing a pilot of a plane equipped with the present device wishes to lower his landing gear preparatory to making a landing, the actuator under these circumstances is in the retracted position as shown in Fig. 1. The pilot will operate the movable contact 200 of the selector switch clockwise so as to engage the stationary terminal 201. Under these circumstances micro switch 161, for instance, would be in a condition closing its gap in the circuit while micro switch 160 would be maintained open due to the fact that in the last operation, which was the raising operation, the final movement of the rotating screw moved the actuator 150 to engage the actuator switch 160 to open its circuit and stop motor operation.

The pilot having closed switch 200 upon terminal 201, current will flow from the source of electrical energy shown as a storage battery 202, through wire 203, across the switch contact 200, terminal 201 through the closed contacts of the micro switch 161 through the magnet winding 204 of the contactor 205 thence back to the battery via ground connections. Current through the magnet winding 204 will energize it to attract the armature of contactor 205, moving the bridging contacts 206 and 207 thereof. Contact 206 will thus bridge terminals 208 and 209, and contact 207 will bridge the terminals 210 and 211. Now current from the battery flowing from wire 203 to the terminal 208 will cross the bridging member 206, terminal 209 thence through wire 212 to the motor field winding 28, the juncture 213 thence through wire 214 to terminal 211 through bridging element 207, terminal 210, wire 215, to wire 216, thence through wire 216 to the juncture 217 where the circuit will be divided, part of it flowing across the armature 26 of the motor to ground, the other flowing through the electromagnetic winding 33 to ground. As these circuits are completed, both the electric motor and the electromagnet clutch 33 will be energized to effect their operation. The motor will start to rotate and the electromagnet clutch being energized will attract the armature disc 38 to engage the now rotating driving disc 31 secured to the armature shaft. Rotation of the disc 38 with the motor will rotate the jack shaft 37 and the gear unit 53, eccentrically mounted on said jack shaft, will be revolved. The gear portion 53a thereof engaging with the non-rotatable ring gear 54 will consequently rotate in response to the rotation of the jack shaft 37, and thus gear portion 53b of unit 53 will likewise rotate. Rotation of the gear 53b is transmitted to the rotatable gear 70 formed on the inner annular surface of the collar 71 and consequently it will be rotated. The nature of this construction will considerably reduce the rotating speed of the collar 71 as compared to the rotating speed of the motor. As collar 71 rotates the screw shaft 80 will likewise be rotated, for said screw shaft is secured to the collar by pin 81. Similarly block 47 will likewise be rotated, for it is anchored to the screw shaft and collars 80 and 71 respectively by said pin 81. The torsion bar 90 is also rotated, for its one end is rigidly secured to the collar 47; therefore in response to the rotation of the electric motor, the collar 71, the screw shaft 80, block 47 and torsion bar 90 will all be rotated in unison and in the same direction.

As the screw shaft rotates, the nut, being held against rotation due to the fact that its tubular extension 100 is secured to the load, will be moved downwardly on the screw shaft 80 and thus lower the load, which, in this instance, is the landing gear of the airplane. The mechanism is so designed that, the landing gear will be moved to proper extended or lowered position when the nut reaches a position on the screw shaft 80 in which its lug 109 lockingly engages the lug 117 on the abutment member 115. This abutment member 115 being secured to the lower end of the torsion bar 90 has been rotating with said torsion bar while the nut 93 was moving downwardly due to the rotation of the screw shaft 80. However, as soon as the lug 109 on the non-rotatable nut engages the lug 117 on the rotating abutment member, rotation of said member and the attached torsion bar will be stopped and thus continued rotation of the screw shaft, due to its connection with the upper end of the torsion bar 90, will twist or deflect said torsion bar. As the torsion bar is twisted, the tubular member 130 secured to the now stationary end of the bar will be held against rotation and in consequence the cam 131 on said tube 130 will likewise be stationary. Now continued rotation of the screw shaft and the friction pins carried thereby will cause said pins to ride from the idling surfaces 132 and 133 of said cam on to the working surfaces thereof, causing said pins to clutch the inner surface of the actuator 150 which has not been rotating with the collar 71 attached to the screw shaft 80. Under these circumstances the actuator 150 will rotate with the collar 71 and screw shaft 80 and consequently the radial arm 151 of said actuator will be moved clockwise to engage and operate the switch 161 to open its circuit. During this time and as a result of the twisting of the torsion bar 90, pins 121 and 122 of the screw shaft have been moved from the circular face of the cam portion 123 on the abutment member 115 toward the flat surfaces thereof.

While the actuator 151 was being moved clockwise toward the switch 161 it moved away from switch 160, permitting switch 160 to close its contacts and engagement of the arm 151 with switch 161 opened its contacts. Now the circuit from the battery through the electromagnet winding 204 is broken and consequently this electromagnet winding 204 of the contactor 205 is deenergized. Following this the armature of said contactor will be released, permitting it to move its bridging elements 206 and 207 into normal position in which they will no longer bridge their respective stationary terminals 208—209 and 210—211. As a result the circuit through the motor field 28, its armature 26 and the electromagnet clutch winding 33 is discontinued and the motor will stop. Deenergization of the magnet winding 33 permits spring 39 to move the armature disc 38 into frictional engagement with the brake ring 40.

If, due to inertia or some other cause, the actuator continues to coast after the motor has stopped its operation, the rotation of the screw 80 will continue until its cross pins 121 and 122 fully engage the flat coinciding surfaces of the cam portion 123 of abutment member 115, at which time the screw 80 will be brought to a stop. These pins 121 and 122 and the cam 123 are sturdily constructed and of sufficient strength to withstand the shock of bringing the screw shaft 80 to a stop without damage to the actuator. The twisting of the torsion bar during this time also acts to cushion the stop.

Now, if the pilot has taken the plane aloft and wishes to retract the landing gear, he moves the contactor 200 of the selector switch into engagement with the terminal 300. Micro switch 160 has its contacts now engaged and consequently circuit through the magnet winding 301 of the contactor 302 is completed, causing the armature thereof to be attracted and move the bridging elements 303 and 304 into bridging contact with their respective terminals. Now current from the battery flows from wire 203 through wire 305, terminal 306, bridge 303, terminal 307, wire 308 through motor field winding 28 in a direction opposite to that previously described, wire 309, terminal 310, bridging member 304, terminal 311, wire 216 through the motor armature 26 and the electromagnet winding 33 back to the battery via ground. With the energization of the electromagnet winding 33 the motor is again connected with the screw shaft 80 and with the energization of the field 28 the motor will operate in a direction reverse to that previously described and consequently screw shaft 80 will be rotated in such a reverse direction. Now the nut travels upwardly on the screw shaft to lift the load, and the landing gear of the plane. When the load is in its proper position the nut will have reached its destination as shown in Fig. 1. Under these circumstances the lug 108 on the collar 107 carried by the extension tube 100 secured to the nut, will lockingly engage the lug 118 on the abutment member 115 to lock it against rotation. This results in a twisting of the torsion bar. As before tube 130 on the torsion bar will again be held against rotation so that its now stationary cam 131 engaged by the pins rotating with the screw shaft will extend the clutch pins again to secure the actuator 150 to the rotating screw shaft 80. Now arm 151 of said actuator will be moved counterclockwise, first permitting switch 161 to close its part of the circuit and finally actuating the switch 160 to open its contacts. Opening switch 160 deenergizes the contactor 302 so that it will move to break the motor and electromagnet clutch winding circuit, rendering both inactive and bringing the motor to a stop. Continued rotation of the screw shaft 80 in this direction will move its pins 121 and 122 to engage the flat faces of cam 123 of the abutment member whereby the screw shaft will be brought to a positive stop.

It will be understood that the extent of moving the weight from one selected position to another determines the length of screw shaft 80 and the amount of travel of the nut 93 on said screw shaft.

From the aforegoing it will be seen that applicant has provided a positively acting and sturdily constructed mechanism adapted automatically to operate motor controlling switches in accordance with the position of the nut on the screw shaft which is turned by the motor. Also sturdy means have been incorporated capable of taking and cushioning the shock for purposes of stopping rotation of the screw shaft beyond safe limits whereby more delicate or weaker portions of the actuator are relieved from taking the damaging impacts sometimes necessary to bring the screw shaft to a complete stop.

While the embodiment of the present invention as herein disclosed, constitutes a preferred form, it is to be understood that other forms might be adopted, all coming within the scope of the claims which follow.

What is claimed is as follows:

1. In combination with a prime mover capable of operating in one or the other direction; means operative to control the prime mover in either direction respectively; cooperating screw and nut members, one of which is rotated by the prime mover, the other member being non-rotatable but movable axially on said one member in response to its rotation; a normally inactive torsion bar; means rendered operative when the non-rotatable member is moved into one or the other predetermined position on the rotatable member, for engaging and holding one end of the torsion bar and causing its deflection, said deflection of the torsion bar increasingly resisting the turning of the rotatable member; and means rendered effective by the holding of one end of the torsion bar for actuating the control means of the prime mover to stop it.

2. In combination with a reversible electric motor, two switches in circuit with the motor, each operative to control motor operation in one direction; cooperating screw and nut members, one of which is rotated by the motor, the other being movable axially on said one member in response to its rotation; a normally rotating torsion bar; means rendered operative by the movement of the axially movable member into one or the other of predetermined positions on the rotatable member for engaging and holding one end of the torsion bar against rotation and causing its deflection, thereby increasingly resisting the turning of the rotatable member; and means operative by the holding of the one end of the torsion bar for actuating one or the other of said switches to stop the motor.

3. In combination with a reversible electric motor, two switches in circuit with the motor, each operative to control motor operation in a respective direction; cooperating screw and nut members, one of which is rotated by the electric motor, the other being held non-rotatable, but movable axially on the rotated member in response to turning thereof; a normally rotating torsion bar; means rendered effective when the axially movable member reaches one or the other of predetermined positions on the rotating member for connecting the torsion bar between the axially movable and rotating members whereby one end of the torsion bar is held against rotation causing it to be deflected and thereby increasingly to resist the turning of the rotating member; and means rendered effective by the holding of one end of the torsion bar against rotation for actuating one or the other of said switches to stop the motor.

4. In combination with a reversible electric motor; a screw shaft rotated thereby; a non-rotatable nut on said screw shaft movable longitudinally thereon in response to rotation of the shaft; two switches in circuit with the motor, each operative to stop motor operation in one direction; a normally inactive actuator for operating said switches; a torsion bar secured at one end to the screw shaft to rotate therewith; means secured to the other end of the torsion bar and engageable by the non-rotating nut when in one or another predetermined position on the screw shaft for resisting rotation of the torsion bar by the screw shaft whereby said torsion bar is twisted; and means rendered operative by the engagement of the nut with said means for securing the switch actuator to the rotating screw shaft and render it active.

5. In a device of the character described, the combination with a reversible electric motor; of a screw shaft operatively connectible to the electric motor to be driven thereby; a non-rotatable nut threadedly mounted on the screw shaft; two limit switches connected in circuit with the electric motor, each operative to stop motor operation; and means operative to actuate one or the other of said switches in accordance with the direction of rotation of said screw shaft, said means comprising a torsion member normally rotatable with said screw shaft and having provisions engageable by the nut when in one or the other of its selected positions on the screw shaft for locking said member against rotation with the screw shaft, thereby applying a torsional strain upon said member causing relative rotation between said member and screw shaft for actuating one or the other of said switches.

6. In a device of the character described, the combination with a reversible electric motor; of a screw shaft operatively connectible to the electric motor to be driven thereby; a non-rotatable nut threadedly mounted on the screw shaft; two limit switches connected in circuit with the electric motor, each operative to stop motor operation; normally inactive means supported by the screw shaft and capable of being rendered operative to actuate one or the other of said switches dependent upon the direction of rotation of the screw shaft; a torsion bar normally rotatable with the screw shaft and having provisions engageable by the nut, as it reaches one or the other of its selected positions on the screw shaft for locking the torsion bar against rotation thereby causing a twisting strain to be applied to the bar upon continued rotation of the screw shaft by the electric motor; and means supported by the bar and rendered effective by the engagement of the nut with the bar for securing the normally inactive switch actuating means to the rotating screw shaft causing a switch to be actuated to stop the motor.

7. In a device of the character described, the combination with a reversible electric motor; a screw shaft having a non-rotatable nut threadedly mounted thereon; an electromagnetic clutch operative to connect the electric motor with the screw shaft; two electric switches, each connected in circuit with the electric motor and the electromagnetic clutch; a normally inactive actuator operative by the screw shaft to actuate one or the other of said switches to stop the electric motor and render the electromagnetic clutch ineffective; a torsion bar connected to the screw shaft to rotate therewith; abutment means on the torsion bar engageable by the nut, when said nut is in one or the other extreme positions on the screw shaft for resisting rotation of said bar by the screw shaft, whereby said bar will be twisted; and means connected to the torsion bar and rendered effective, for securing the switch actuator to the screw shaft, when the abutment means is engaged by the nut.

8. In a device of the character described, the combination with a reversible electric motor; a screw shaft having a non-rotatable nut threadedly mounted thereon; an electromagnetic clutch operative to connect the electric motor with the screw shaft; two electric switches, each connected in circuit with the electric motor and the electromagnetic clutch; a normally inactive actuator operative by the screw shaft to actuate one or the other of said switches to stop the electric motor and render the electromagnetic clutch ineffective; a torsion bar having one end connected to the screw shaft to be rotated thereby; an abutment collar secured to the other end of the torsion bar; means provided on the nut, engageable with the abutment collar when the nut is moved into one or the other of its extreme positions on the screw shaft in response to rotation of said shaft in one or the other direction respectively, said means locking the abutment collar against rotation thereby causing the torsion bar to be twisted by continued rotation of the screw shaft; a tubular member secured to the end of the torsion bar adjacent the abutment member; a cam on said tubular member; and means operative by said cam in response to continued rotation of the screw shaft, for securing the switch actuator to the screw shaft.

9. In a device of the character described, the combination with a reversible electric motor; a screw shaft driven by said motor; a non-rotatable nut threaded to said shaft and movable longitudinally thereon in response to rotation of the shaft; switches for controlling the operation of the motor; a normally inactive actuator for said switches; a twistable member rotated by the screw shaft; means rendered operative by the nut when in one or the other extreme positions on the screw shaft for engaging said member and stopping the rotation thereof causing said member to twist and gradually resist rotation of the shaft; and means operative by the continued rotation of the shaft for securing the switch actuator to the screw shaft whereby said actuator is rendered active to operate one or the other switch, dependent upon the direction of shaft rotation for stopping the motor.

10. In a device of the character described, the combination with a reversible electric motor; a screw shaft driven by the motor and having a twistable member extending therefrom; a nut threaded to said screw shaft and movable between two selected positions on the shaft in response to rotation of the shaft by the motor; means on the nut engageable with the twistable member on the screw shaft when the nut reaches one or the other of said selected positions, for locking said member against rotation with the shaft and causing a twisting thereof; switches, each operative to stop motor operation in one direction; and means operative in response to the locking of said member against rotation and the continued rotation of the shaft, for rendering one or the other of said switches operative.

11. In combination with a reversible prime mover; of a shaft rotated thereby; means connected to the shaft and reciprocated thereby; a torque element rotated by the shaft; a cam rotatable with the torque element; control devices for stopping said prime mover; a normally inactive actuator for said devices; clutch means interposed between the cam and actuator, normally rotatable with the cam and ineffective as regards the actuator; and means on the reciprocative means, engageable with the torque element to stop its rotation and rotation of the cam and effect torsional deflection of said element gradually to resist shaft rotation, stopping of the cam rotation effecting operation of the clutch means interposed between the cam and actuator whereby said actuator is rendered effective to operate a control device to stop the prime mover.

12. In combination with a reversible electric motor; of mechanism rotated thereby and comprising a screw shaft carrying a non-rotatable nut and having one end of a cam supporting torsion bar connected therewith; motor stopping switches; a normally inactive actuator for said switches; clutch mechanism engaged by and normally rotatable with the cam; and means carried by the nut, for engaging the torsion bar to stop its rotation and cause a twisting thereof for gradually resisting rotation of the shaft, and for causing relative rotation between the cam and clutch mechanism whereby said mechanism will secure the actuator to the rotating shaft to effect actuation of a motor stopping switch.

13. In combination with a reversible electric motor; of a screw shaft rotated thereby; a non-rotatable nut on said shaft; a torque element rotated by the shaft; a cam rotated by said element; clutch mechanism engaging the cam and normally rotating therewith; switches for stopping the motor; a normally inactive actuator for said switches; and means on the nut engageable with the torsion element to stop rotation and cause rotary deflection of said element for gradually resisting rotation of the shaft, cessation of rotation of the torque element effecting a relative rotation between the clutch mechanism and cam whereby said clutch mechanism will secure the actuator to the shaft and render it effective to operate a switch and stop the motor.

14. In combination with a reversible electric motor; of a shaft rotatable thereby; a non-rotatable sleeve on the shaft; means for securing the sleeve to the shaft for causing said sleeve to move longitudinally on the shaft in response to rotation of said shaft; a torque element connected to and rotatable with said shaft; a cam rotated by said torque element; control switches for stopping the motor; a normally inactive actuator for said control switches; clutch means carried by the shaft so as to be interposed between the cam and actuator, said clutch means engaging the cam and being normally ineffective as regards the actuator; and means on the non-rotatable sleeve, engageable with the torque element to stop its rotation and rotation of the cam and effect torsional deflection of said element gradually to resist shaft rotation, stopping of the cam rotation effecting operation of the clutch means interposed between the cam and actuator whereby said actuator is rendered effective to operate a control switch to stop the motor.

CALVIN J. WERNER.